June 12, 1956  G. C. ROBB  2,750,209
VALVE COUPLING
Filed Aug. 3, 1951  3 Sheets-Sheet 1

INVENTOR.
George C. Robb
BY Green, McCallister & Miller
HIS ATTORNEYS

June 12, 1956  G. C. ROBB  2,750,209
VALVE COUPLING
Filed Aug. 3, 1951  3 Sheets-Sheet 2

INVENTOR.
George C. Robb
BY Green, McCallister & Miller
HIS ATTORNEYS

INVENTOR.
George C. Robb
BY Green, McCallister & Miller
HIS ATTORNEYS

United States Patent Office 2,750,209
Patented June 12, 1956

2,750,209

VALVE COUPLING

George C. Robb, Allegheny County, Pa., assignor to Robb Manufacturing Company, Pittsburgh, Pa., a corporation of Pennsylvania Application August 3, 1951, Serial No. 240,144

5 Claims. (Cl. 284—19)

This invention relates to fluid couplings provided with valve means for shutting off fluid flow when male and female parts of the coupling are disconnected and particularly, to an automatic valve which will be in an open position when the coupling parts are in a connected relationship and will be in a closed relationship when they are separated.

In carrying out my invention, I employ a fully swivel type of snap coupling with an automatic valve operably positioned therein. Previous to my invention, automatic coupling valves have tended to create turbulence of flow through the coupling, to vibrate during such flow, and to leak when the coupling parts are separated.

It has been an object of my invention to provide a new and improved form of coupling valve arrangement.

Another object has been to devise a coupling valve arrangement which will permit substantially a full volume of fluid flow corresponding to the effective diameter of the pipe sections that are connected thereby without setting up turbulence in the flow.

Another object has been to eliminate the disadvantageous features of prior devices in this field and particularly, to provide a valve whose operation will be positive and which will not flutter or vibrate during fluid flow.

These and many other objects of my invention will appear to those skilled in the art from the accompanying drawings, the description of the illustrated embodiments and the claims.

As illustrated, I employ a snap type of coupling having a female or main body part which carries a series of locking balls in spaced-apart annular progression thereabout to lock or engage within an annular race of a secondary male part, or nipple which is adapted to be slid (telescope) within the female part. The body of female part is provided at its other end, a pipe adapter portion at its other end, a valve mounting structure, and valve guide means associated therewith. A spring-pressed valve is operably positioned on the valve mounting structure and is adapted to be pushed to an open position by compressing its spring when the male part is inserted into and locked with respect to the female coupling part. U or V-shaped resilient gaskets are employed with the valve and the male and female coupling parts to positively seal off fluid flow. Such gaskets are positioned in such a manner that their chamber-defining lips or side walls point or face radially-inwardly of the coupling construction. As a result, only a minimum pressure is necessary for sealing off the fluid, in that the fluid tends to expand the lip portions and further the sealing action.

Figure 1:
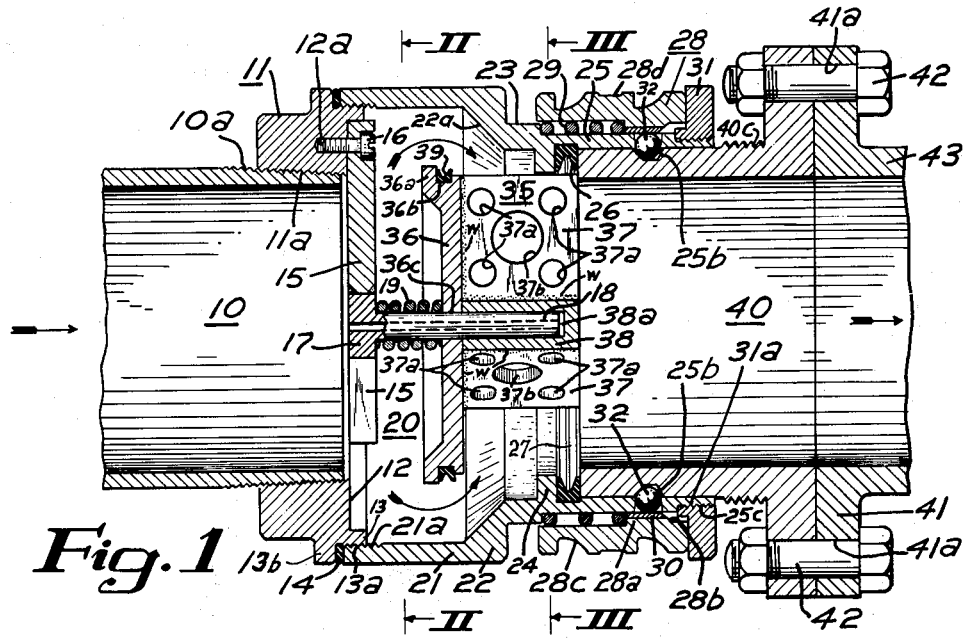
Figure 1 is a vertical section taken longitudinally-axially through a coupling constructed in accordance with my invention.

Referring particularly to Fig. 1 of the drawings, I have shown a pipe section 10 externally threaded at 10a and secured to an adapter portion 11 of the main or female body part by interengagement with female threads 11a thereof. The adapter 11 has an annular inset portion or groove 12 within its front face wall 13 to receive arm portions 15 of a valve-mounting spindle or spider construction. Each of the arms 15 is secured in position within the recessed or inset portion 12 by set screws 16, see also Fig. 2, which extend into threaded bores 12a of the adapter 11.

Figures 2, 3:
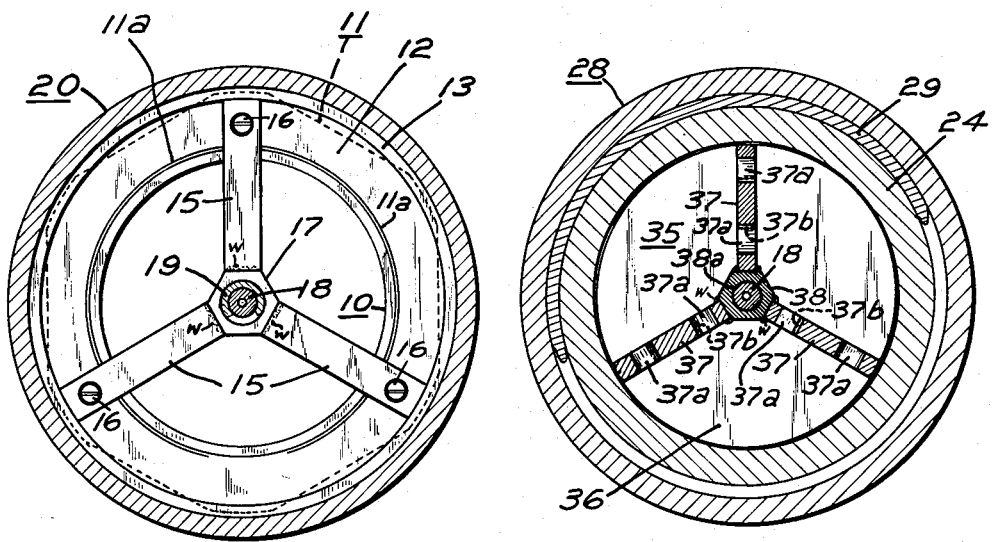
Fig. 2 is a transverse section taken along the line II—II of Fig. 1.
Fig. 3 is a similar section taken along the line III—III of Fig. 1.
Figure 7:
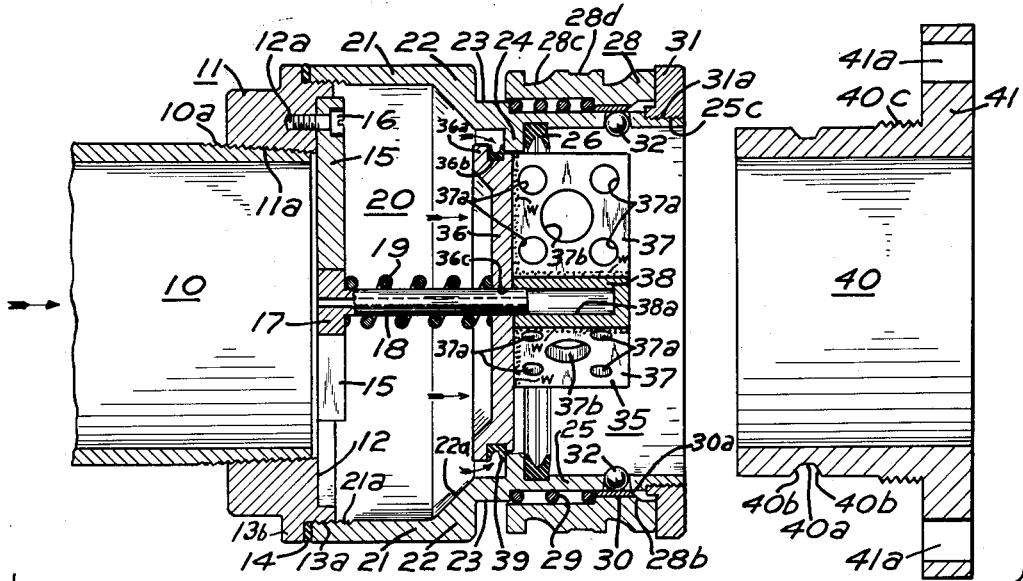
Fig. 7 is a view similar to Fig. 1 illustrating the valve coupling with its male and female parts in a separated relationship and its valve part in a closed positition.

The valve support spider or spindle is also provided with a valve guide stem 18 having a head portion 17 secured, as shown in Figs. 1, 2 and 7, to the inner ends of the arms 15 by weld metal w. The guide stem 18 is preferably of a wear-resistant strong metal, such as stainless steel, while the spindle arms 15 may be of ordinary metal construction.

Figure 4:
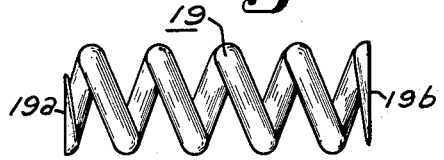
Fig. 4 is an enlarged detail view of a valve control spring employed in the construction of Fig. 1.

A spiral tension spring 19, see Figs. 1, 4 and 7, is positioned on the valve guide stem 18 to extend therealong and normally force the valve forwardly to a closed position. This spring has flattened face end portions 19a and 19b, as shown particularly in Fig. 4, so that it will concentrate its force fully axially on the guide stem 18 about which it is mounted.

The female coupling or body part 20 also has an enlarged, integral back wall portion 21, an inwardly-offset connecting shoulder portion 22, a connecting portion 23, an internal stop flange or rim portion 24, and a locking or front wall portion 25. Internal threads 21a at the outer end of the wall portion 21 engage external threads 13a adjacent the face 13 of the adapter part 11. A flat adapter sealing gasket 14 is interposed between the outer edge of the portion 21 and a flange 13b of the adapter 11.

The wall portion 21 has a bore which defines an enlarged internal chamber which at its inner end terminates in a conical bore defined by an inclined face 22a of the shoulder portion 22. The connecting portion 23 has a bore of smaller diameter open to the converging end of the bore 22a and is connected to the flange portion 24 which extends radially-inwardly of the body part 20 to form a positioning annulus for the valve. The front wall portion 25 is connected to the flange portion 24 and is provided with a series of spaced-apart, peripherally-located, ball-receiving holes or slots 25b therethrough.

Figures 8, 9:
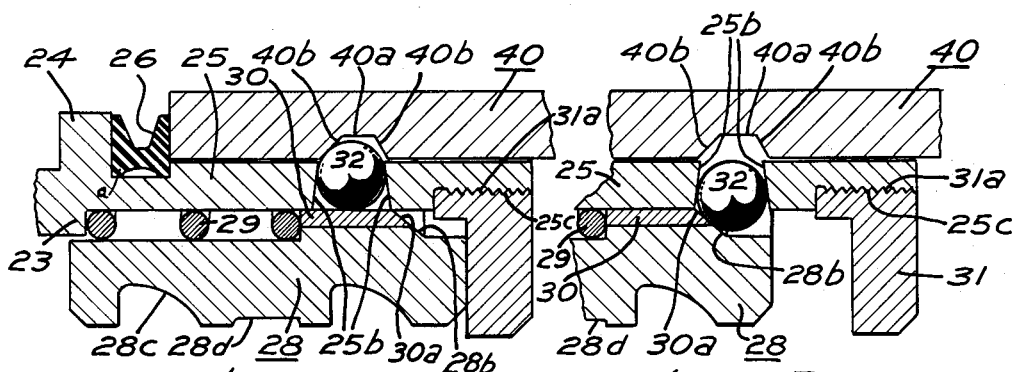
Fig. 8 is an enlarged longitudinal sectional detail through the coupling of Fig. 1 showing the latching parts in the relationship of Fig. 1.
Fig. 9 is a longitudinal fragmental sectional detail of the coupling when its parts are in the position of Fig. 6.

The slots 25b are adapted to receive locking balls 32 and have, as shown particularly in Figs. 8 and 9, opposed, sloped side walls which define an included angle with respect to the vertical of about 14° to 15°. A latching spring 29 of spiral shape is adapted to be positioned about an outer face of the wall portion 25, at one end to engage a shoulder defined by the connecting wall portion 23, and at its other end to engage an internal flange defined by a locking sleeve member or part 28.

Figure 10:
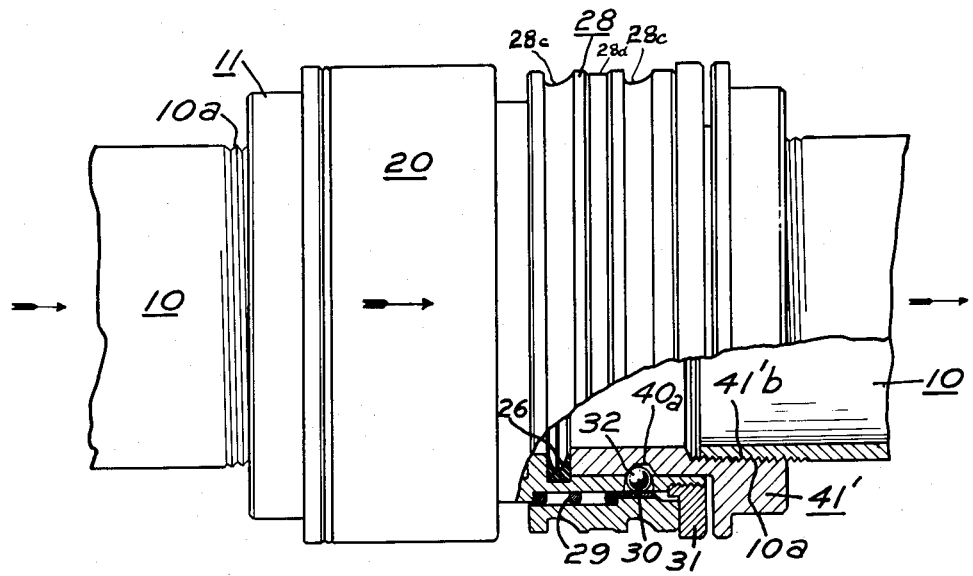
Fig. 10 is a longitudinal-axial view in elevation of the coupling of Fig. 1 with a portion of its wall broken away to illustrate an internally threaded male or nipple part such as may be used with an externally threaded pipe section.

The locking sleeve 28 has an internally-projecting side wall 28a which as shown, carries a wear-resistant band or sleeve 30 which is preferably of stainless steel, and which may be welded or shrunk-fit thereon to bear against the locking balls 32. As illustrated particularly in Figs. 8 and 9, the locking sleeve 28 also has at its outer end, a sloped, ball-receiving surface 28b which co-operates with a similarly sloped, outer edge 30a of the band 30 to receive and guide the balls 32 when the sleeve 28 is moved to the ball-releasing position of Fig. 9. The outer surface of the latching sleeve 28 is, as shown in Figs. 7 and 10, provided with a series of hand-grip grooves 28c of considerable depth and an intermediate groove 28d of lesser depth.

A flange nut 31 is internally threaded at 31a to engage external threads 25c of the wall portion 25. This flange, as shown particularly in Figs. 8 and 9, serves as a limit flange for the operation of the latching sleeve member 28 and can be removed to disassemble the latching mechanism and replace the latching balls 32.

The wall portion 25 of the female body part 20 has an annular groove of rectangular cross-section extending internally about it adjacent the flange portion 24 to receive a gasket element 26. The gasket element 26 serves two functions. In the first place, it seals off the male or nipple coupling part 40 with respect to the female or body coupling part 20 when they are in the assembled relationship of Fig. 1 and in the second place, serves as a vibration dampening guide support for the valve 35.

The valve 35, as shown particularly in Figs. 1 and 7, has a dished-out, disk-shaped back wall 36, as shown particularly in Fig. 3, a series of equally-spaced guide wing or rib portions 37, and a central bearing hub 38, all of which parts are secured together as a unitary whole by brazing or welding metal w. Each of the wings 37 is provided with a series of holes 37a through its face and adjacent its four corners (it is of rectangular shape) and a central, enlarged hole or opening 37b. These holes permit free fluid flow between the compartments defined by the wings 37 and prevent setting up unbalanced forces during the flow of fluid through the coupling. As shown particularly in Figs. 1 and 7, the hub 38 of the valve is of wear-resistant bearing material and its bore 38a slidably positions the inner end portion of the valve stem 18. Such valve stem extends through a central opening 36c in the back or disk wall 36 of the valve into the bore 38a of the hub. It will be noted that the back face of the disk wall 36 is cut out adjacent its flange 36a to form an annular, gasket-receiving groove 36b. A valve gasket 39 is adapted to be positioned in the groove 36b, and when the valve 35 is in a closed position, the gasket 39 abuts against an outer face of the flange portion 24 of the body part 20.

Figure 5:
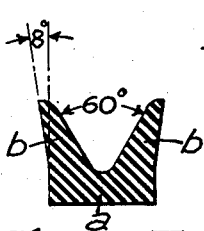
Fig. 5 is an enlarged transverse section through a U or V-shaped sealing gasket that is employed in the construction of Fig. 1.

The gasket 26 may be securely held in position by an expansion spring wire 27 positioned within its chamber to abut against its base portion. If desired, a similar wire may be used for the gasket 39. It will be noted that both the gaskets 26 and 39 are of similar design, as illustrated in Fig. 5, and that they are positioned with their base portions a in contact with adjacent back or bottom faces of the rectangular grooves within which they are mounted. They also have a flare in their side walls b which further aids in retaining them in their respective groove seats. As shown in Fig. 8, the outer face of the base a has a vacuum cup shape when a gasket of the type of Fig. 5 is employed; this provides a suction holding action. The cup shape results from employing a gasket-receiving recess of lesser transverse dimension than the gasket, although I have also formed cups in the gaskets as molded.

Figures 11, 12:
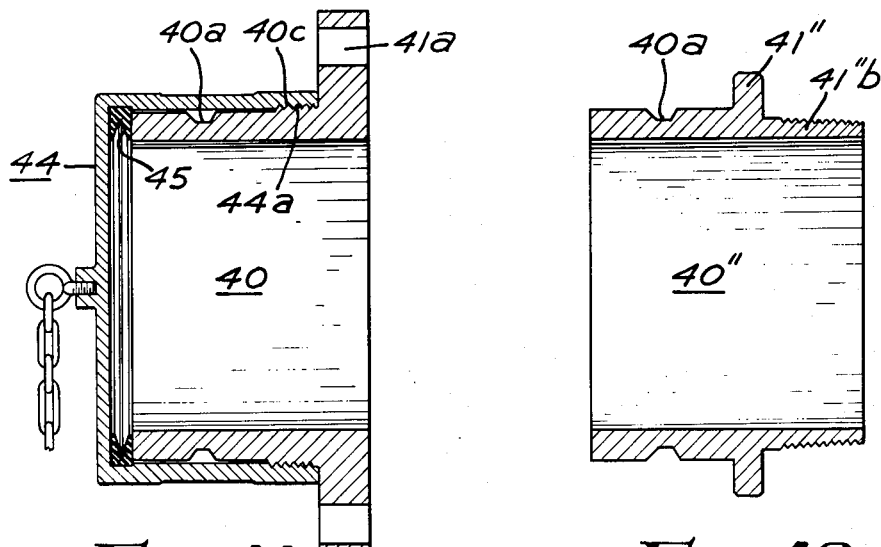
Fig. 11 is a sectional view through the male or nipple part illustrated in Fig. 7 with a closure cap mounted thereon.
Fig. 12 is a longitudinal-axial section through a nipple or male coupling part designed to utilize an internally threaded pipe section.

In Figs. 1 and 7, I have shown one form of male or nipple coupling part 40 which has an annular race defined by a groove having a planar bottom face 40a and inclined side faces 40b. The side faces 40b preferably define an included angle of 45° which is an obtuse angle with respect to the back face 40a. If, as shown in Fig. 11, a cap member 44 is to be provided for closing off the nipple 40 when it is in a detached or unlatched position, I provide it with external or male threads 40c which co-operate with threads 44a of the cap to secure the latter in position. A U-shaped gasket 45 of the type shown in Fig. 5 is positioned between the back wall of the cap 44 and the inner edge wall of the nipple part 40 to positively seal off the end of the nipple part 40.

If the nipple part 40 is to be secured to a flange pipe section 43, see Figure 1, I provide it with a flange 41 having a series of holes 41a for receiving bolt and nut assemblies 42. If, on the other hand, the nipple part 40' as shown in Fig. 10, is to be secured to an external thread 10a of a pipe section 10, flange 41' is provided with internal threads 41'b which are engaged thereby. In Fig. 12, I have shown a nipple part 40'' whose flange 41'' is provided with an externally-threaded wall 41'b, so that it can be secured to an internally-threaded pipe section.

When the nipple part 40 is to be coupled and locked in position, a study of Figs. 1, 6, 7 and 8 of the drawings will disclose that it is moved from the position of Fig. 7 by pushing it into the body part 20, see Fig. 1, so that the balls 32 engage the race faces 40a and 40b. It will be noted that the edge wall of the nipple part 40, in addition to engaging the coupling sealing gasket 26 to prevent leakage between the male and female coupling parts, also engages the wings 37 of the valve 35 to force it to the open position of Fig. 1 by compressing the spring 19. At this time, flow of fluid from the pipe section 10 is indicated by the arrows of this figure.

Figure 6:
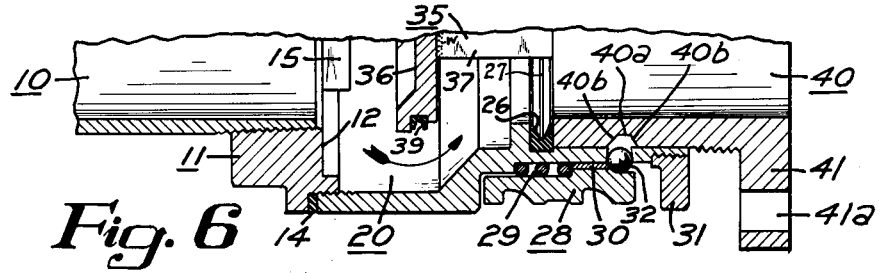
Fig. 6 is a fragmentary section taken longitudinally of the coupling arrangement of Fig. 1, but showing a coupling sleeve part moved to the left to permit the uncoupling of the male and female parts.

When the nipple 40 is to be removed, the latching sleeve 28 is first moved to the position of Fig. 6 to compress the latching spring 29 and release the locking balls 32 and then, the nipple part 40 is pulled out of the body part 20 to the position shown in Fig. 7. At this time, the valve spring 19 forces the valve to a closed position, such that the valve gasket 39 seals off fluid flow from the pipe section 10.

As will be noted, the valve 35 is positively supported at its axial center by the stem 18 and at its outer periphery by a balanced three-part guide construction defined by the wings 37. The internal flange 24 of the body part 20, supplemented by the coupling gasket 26 slidably engages the wings 37. It is thus apparent that vibration or fluttering of the valve 35 is entirely eliminated and that wear upon it and its associated parts is minimized. As indicated by Figs. 1, 2 and 3, the valve support and the valve, itself, present a minimum interference to fluid flow and the coupling defines an effective internal flow diameter which corresponds substantially to at least the diameter of the connected pipe sections. It will be noted that the employment of a demountable adapter 11 with the body part 20 makes it possible to assemble and disassemble the valve 35.

In the valve construction of my present invention, it is impossible for the valve 35 to move axially out of its operative relationship within the female body part 20 during its operation. That is, the inwardly projecting rim or flange portion 24 has a smaller diameter than the flange 36a of the valve 35 and as a result, the flange 24 serves as a positive limit for the maximum axial outward movement of the valve 35. The inward movement of the valve 35 is limited by the spring 19 to, as shown in Fig. 1, present an effective fluid flow channel that is substantially equal to the fluid flow channel represented by the diameter of the connected pipe section 10. When the valve 35 is in its fully open position of Fig. 1, its flange 36a is also in a spaced relationship with respect to the spindle arms 15 of the support structure and is located in the enlarged channel or chamber portion of the female body 20. When a valve of this type is used in a lubricating line, for example in a rolling mill, it is highly important that a full flow of the oil be insured to prevent burning out of the applicable bearings. It is also important to prevent leakage of the coupling so that the oil does not flow onto the product, such as bright sheet metal. By means of the construction of my device, if the pipe section 10 is designed to provide a fluid flow, for example of six inches, then the enlarged chamber defined by the portion 21 of the female part will be about nine inches in diameter and the resultant flow when the valve 35 is open is equivalent to a full six inch flow.

The embodiments of the invention in which an exclusive property or privilege is claimed are defined as follows:

1. A valved coupling construction comprising, a pair of body parts to be removably connected in telescopic fluid-flow relationship with each other; one of said body parts having a back wall portion, an intermediate internal stop flange integral with said body part, and a front wall portion; the front face of said internal stop flange and said front wall portion defining an annular recessed portion, an annular gasket positioned in said recessed portion adjacent the front face of and projecting radially-inwardly along said stop flange, a spider mounted within said back wall portion having a guide stem attached thereto, said guide stem extending axially-forwardly in said back wall portion toward said stop flange, a unitary valve structure; said unitary valve structure having a disk-shaped back wall, a bearing hub extending axially-forwardly thereof, and equally-spaced guide wings extending radially-outwardly from said bearing hub; said bearing hub being mounted on said guide stem for movement thereon and in such a manner as to position said equally-spaced guide wings within said internal stop flange, said guide wings extending radially-outwardly into a slidably-guided relation within the inner diameter of said internal stop flange and for slidable dampening engagement with the annular seating gasket, means retaining said guide wings in the defined relation within said internal flange and with respect to said annular gasket during operative movement of said valve structure between open and closed positions, abutment means on the other of said body parts which engages said annular seating gasket and which moves said valve means axially to clear the opening through said one body part when the body parts are in telescopic relationship, said retaining means having means biasing said unitary valve structure away from said spider to force the disk-shaped back wall of said unitary valve structure into engagement with a back face of the internal flange of said one body part and close off said one body part when the body parts are disconnected, and means to lock said body parts in their telescopic position.

2. An improved valved coupling construction comprising, a pair of body parts to be removably connected in a telescopic fluid-flow relationship with each other; one of said body parts having a back wall portion, an intermediate internal stop flange integral with said body part, and a front wall portion; the front side of said internal stop flange and said front wall portion defining an annular recessed portion, an annular gasket positioned in said recessed portion adjacent to and projecting radially-inwardly and along front side of said internal stop flange, a spider mounted within said back wall portion having a guide stem attached thereto, said guide stem extending axially-forwardly in said back wall portion toward said stop flange, a unitary valve structure; said unitary valve structure having a disk-shaped back wall, a bearing hub extending axially-forwardly thereof, and equally-spaced guide wings extending radially-outwardly from said bearing hub; said bearing hub being mounted on said guide stem for movement thereon and in such a manner as to position said equally-spaced guide wings within said internal stop flange, said guide wings extending radially-outwardly into a slidably-guided relation within said internal stop flange for guided movement therein; and for slidable dampening engagement with said annular gasket, means retaining said guide wings in the defined relation slidably within said internal flange and with respect to said annular gasket during operative movement of said valve structure between open and closed positions; abutment means on the other of said body parts to form a sealing engagement with said annular gasket and to move said valve structure axially to clear the opening through said one body part when the body parts are in their telescopic relationship, said disk-shaped back wall having an annular groove and an annular flange of greater diameter than said stop flange, an annular seating gasket positioned in said annular groove of said disk-shaped back wall, said retaining means having means biasing said unitary valve structure away from said spider to compress said annular seating gasket between a back side of said stop flange and the annular flange on said disk-shaped back wall to close off said one body part when the body parts are disconnected, and means to lock said body parts in their telescopic position.

3. An improved valve construction as defined in claim 2 wherein, said annular seating gasket and said annular gasket each have a base wall and a pair of spaced-apart side wall portions defining a radially-open fluid-receiving chamber for improved sealing.

4. An improved valve coupling comprising a pair of body parts to be removably connected in a telescopic fluid-flow relation with each other; one of said body parts having a back wall portion and a front wall portion defining a bore wall therethrough, and an internal-stop and a slide-guide flange integral with and projecting radially-inwardly from said bore wall; a spider mounted within said back wall portion and having a guide stem extending axially-forwardly along said back wall portion toward said front wall portion; a unitary valve structure having a disc-shaped back wall, a bearing hub extending axially-forwardly of said disc-shaped back wall, and guide wings extending radially-outwardly from said bearing hub into a cooperative slidably-guided relation within said internal flange; said bearing hub being slidably mounted on said guide stem and within said internal flange to guide said valve structure in its operative movement between open and closed positions with respect to and within said internal flange; means retaining said valve structure in a slidably-guided operative relation on said guide stem and within said internal flange; a front face of said internal flange and said front portion defining an annular gasket-receiving recess portion; an annular gasket positioned in said recess portion and projecting radially along the front face of said internal flange, said gasket having a slidable dampening engagement with said guide wings during the operative movement of said valve structure; abutment means on the other of said body parts for moving said valve structure to an open position within said one body part when the body parts are in their telescopic relation; said retaining means having means biasing said valve structure away from said spider to force said disc-shaped back wall into a fluid-flow closing-off relationship with said internal flange when the body parts are disconnected, and means to lock said body parts in their telescopic relation.

5. An improved valve coupling as defined in claim 4 wherein, said guide wings have a substantially equal circumferentially spaced-apart relation with each other and define fluid compartments within said internal flange, and each of said guide wings has at least a pair of fluid-flow open portions transversely therethrough to provide cross-flow of fluid between the compartments.

(References on following page)

References Cited in the file of this patent

UNITED STATES PATENTS

| | | |
|---|---|---|
| 1,990,557 | Melott | Feb. 12, 1935 |
| 2,096,444 | Arvintz | Oct. 19, 1937 |
| 2,135,222 | Scheiwer | Nov. 1, 1938 |
| 2,218,318 | Pfauser | Oct. 15, 1940 |
| 2,255,333 | Scheiwer | Sept. 9, 1941 |
| 2,413,978 | Krone et al. | Jan. 7, 1947 |
| 2,425,500 | Wiggins | Aug. 12, 1947 |
| 2,439,760 | Thomas | Apr. 13, 1948 |
| 2,441,075 | Krapp | May 4, 1948 |